United States Patent
Kilday et al.

(10) Patent No.: US 9,460,026 B1
(45) Date of Patent: Oct. 4, 2016

(54) APPLICATION-SUPERVISED ACCESS TO MANAGED CONTENT

(75) Inventors: Roger W. Kilday, Livermore, CA (US); Aamir Farooq, Danville, CA (US)

(73) Assignee: EMC Corporation, Hopkinton, MA (US)

(*) Notice: Subject to any disclaimer, the term of this patent is extended or adjusted under 35 U.S.C. 154(b) by 1376 days.

(21) Appl. No.: 11/393,039

(22) Filed: Mar. 30, 2006

(51) Int. Cl.
*G06F 12/00* (2006.01)
*G06F 12/14* (2006.01)

(52) U.S. Cl.
CPC .................................... *G06F 12/14* (2013.01)

(58) Field of Classification Search
CPC ...................................................... G06F 12/14
See application file for complete search history.

(56) References Cited

U.S. PATENT DOCUMENTS

| | | | |
|---|---|---|---|
| 5,649,099 A * | 7/1997 | Theimer et al. | 726/4 |
| 5,787,427 A * | 7/1998 | Benantar et al. | |
| 5,950,195 A * | 9/1999 | Stockwell et al. | 707/4 |
| 6,189,100 B1 * | 2/2001 | Barr et al. | 713/182 |
| 6,229,456 B1 * | 5/2001 | Engholm et al. | 341/35 |
| 6,330,715 B1 * | 12/2001 | Razzaghe-Ashrafi | 717/171 |
| 2003/0225871 A1 * | 12/2003 | Calinov et al. | 709/223 |
| 2005/0097441 A1 * | 5/2005 | Herbach et al. | 715/501.1 |

* cited by examiner

*Primary Examiner* — Larry Mackall
(74) *Attorney, Agent, or Firm* — Van Pelt, Yi & James LLP (57) ABSTRACT

Application supervised access to managed content is disclosed. In some embodiments, a free form ACL is defined to delegate to one or more users and/or groups of users an access right or restriction a content manage system is not configured to understand and/or enforce. In some embodiments, if a user requests that an application perform an operation with respect to a content item, the application queries a content management system to determine whether the user has been granted the right to perform the requested operation with respect to the content item. The authoring application then allows or disallows the requested operation based at least in part on the information provided by the content management system.

22 Claims, 8 Drawing Sheets

| ACL | |
|---|---|
| JOE | WRITE |
| ENG DEPT | READ |
| ADMIN | DELETE |

APPLICATION-SUPERVISED ACCESS TO MANAGED CONTENT

BACKGROUND OF THE INVENTION

Typically, in a content management system and in other contexts in which access to electronically stored content is restricted, a user (individual, system, application, process, etc.) is permitted to access a content item if the user is included, individually or by virtue of membership in a group, in an "access control list" (ACL) associated with the content item. Typically, the ACL specifies a level of access to be allowed, e.g., by specifying a type of permit selected from a set of predefined options, such as "browse", "read", "write", and "delete".

In some contexts, however, it may be necessary and/or desired to control access in other and/or additional ways. For example, it may be desirable to use an ACL to restrict and/or grant an access right not contemplated by or included in any of the predefined permits, such as the ability to "print" a document, or "play" multimedia content, or "export" content to another destination/format.

Therefore, there is a need for an effective way to define and enforce access and use restrictions in a manner not provide for by a set of predefined access permits.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Application supervised access to managed content is disclosed. In some embodiments, a free form ACL is defined to delegate to one or more users and/or groups of users an access right or restriction a content manage system is not configured to understand and/or enforce. Such an application-supervised ACL is sometimes referred to herein as an "application permit". In some embodiments, if a user requests that an application perform with respect to a content item an operation for which an application permit has been defined, the application queries a content management system on which the content item and the application permit are stored to determine whether the application permit grants the user the right to perform the requested operation with respect to the content item. For example, if a user requests that an authoring application "print" a document, in some embodiments the authoring application would query the content management system to determine whether the user is granted in the application permit a privilege level that includes the right to print. The content management system does not understand or enforce the right/restriction and instead merely responds to inquiries from the authoring application regarding what the application permit says or does not say about the rights of a particular user. The authoring application then allows or disallows the requested operation based at least in part on the information provided by the content management system based at least in part on the application permit.

Figure 1:
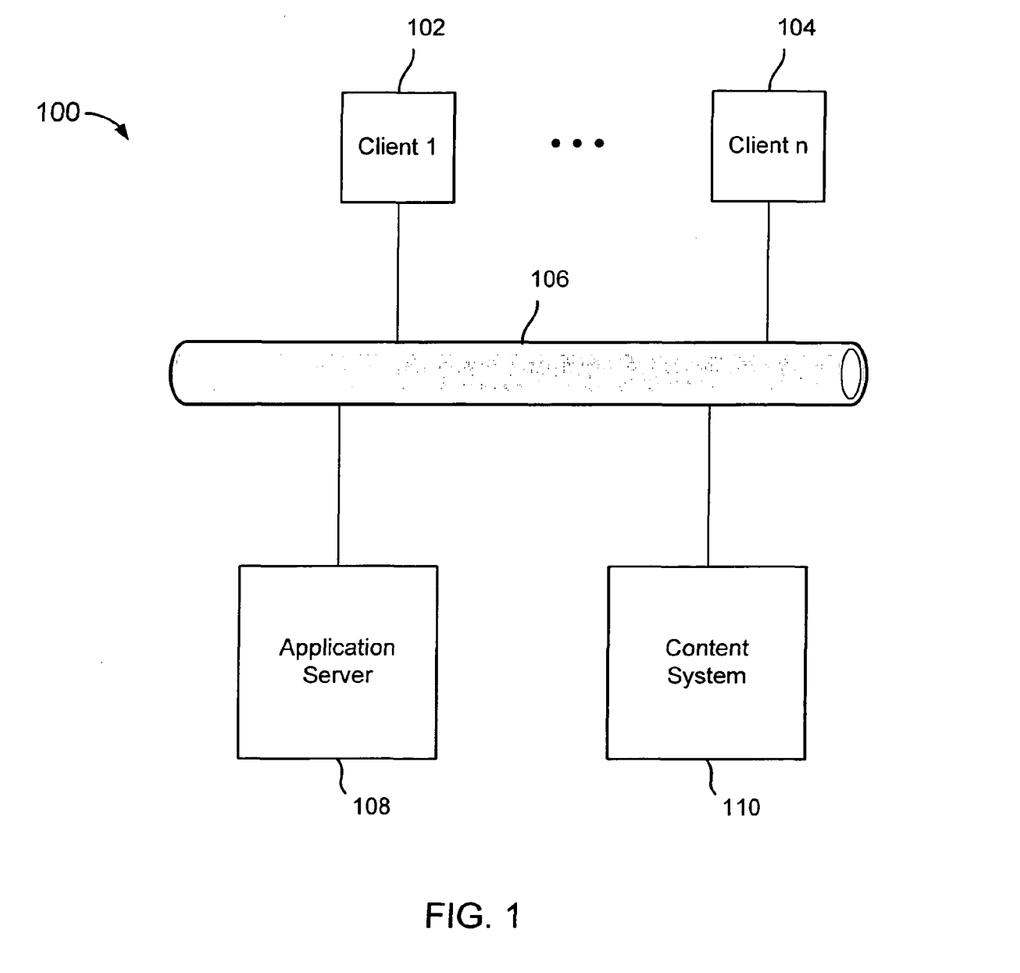
FIG. 1 is a block diagram illustrating an embodiment of a system for accessing and using managed content.

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110.

Figure 2:
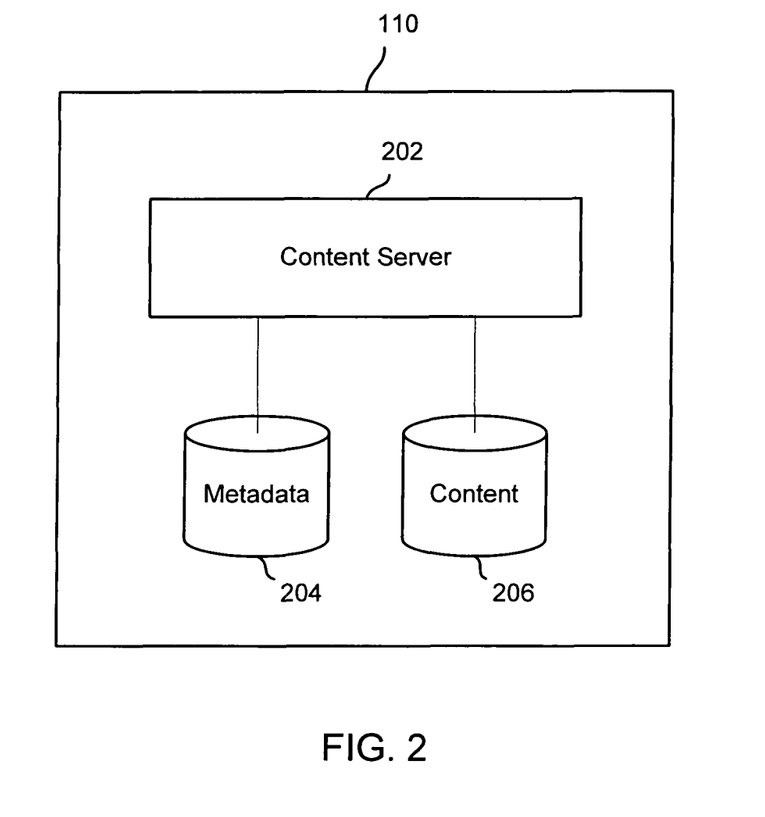
FIG. 2 is a block diagram illustrating an embodiment of a content system.

FIG. 2 is a block diagram illustrating an embodiment of a content system. In the example shown, content system 110 includes a content server 202 configured to provide access to and/or store content items, e.g., files, database tables, etc., stored in content store 206. In various embodiments, content server 202 and content store 206 reside on the same or different physical devices and/or systems, such as on separate servers or other computers. Content server 202 manages content items stored in content store 206 at least in part by associating with each of at least a subset of the content items stored in content store 206 corresponding metadata stored in metadata store 204. In some embodiments, the metadata is stored in the form of one or more software objects configured and used to represent an associated content item within a body of managed content. Examples of metadata include content item owner, author, title, date created, date last accessed, version, content type, file or data format, authoring application, recipient, sender, relationship to other content item(s), keyword(s), etc. In some embodiments, content server 202 uses the metadata to manage (e.g., track) and provide managed access to associated content items, e.g., by executing and returning results for metadata and/or full-text index based queries and providing content management functions such as check-in/check-out, versioning, save, delete, etc.

In some embodiments, one or more objects to represent a content item in metadata store 204 are created by and/or in response to a request from an application running on an associated content management framework (e.g., foundation classes, business logic, and/or API). For example, an application may populate and/or provided data values for metadata object attributes and/or provide the associated content and/or indicate to the content server a location (e.g., on the application server and/or an associated client) where the content is located. The content server stores the content in content store 206 and associates the content as stored in content store 206 with the corresponding metadata in metadata store 204.

Figure 3:
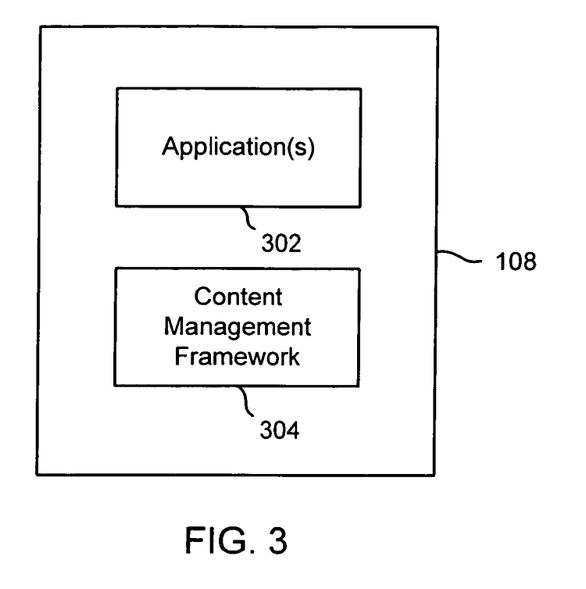
FIG. 3 is a block diagram illustrating an embodiment of an application server.

FIG. 3 is a block diagram illustrating an embodiment of an application server. In the example shown, application server 108 includes one or more applications 302 running on a content management framework 304. The application(s) use(s) the content management framework 304, e.g., an API, foundation Java classes, core content management logic and/or services, etc., to store and access managed content.

Figure 4:
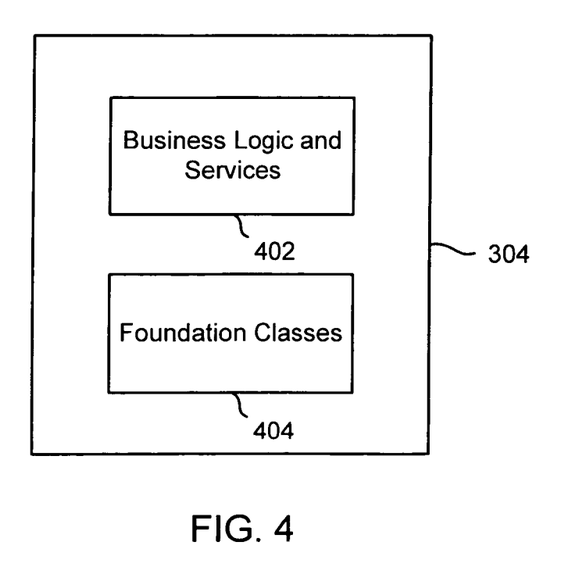
FIG. 4 is a block diagram illustrating an embodiment of a content management framework.

FIG. 4 is a block diagram illustrating an embodiment of a content management framework. In the example shown, content management framework 304 includes an extensible business object framework 402 and foundation (e.g., Java object) classes 404. In some embodiments, the business object framework 402 comprises part of foundation classes 404. The business object framework 402 in some embodiments enables an application developer, application or other code, or another user to define access restrictions to be associated with an item of content, e.g., by specifying access rights and/or restrictions to be included in an access control list (ACL) or like structure associated with the item of content. In some embodiments, an ACL is linked to and stored with metadata associated with the item(s) of content to which the ACL applies. In some embodiments, an ACL is implemented as a software object stored persistently with, e.g., in a metadata store such as a database, and linked to an implementation object configured to represent and/or provide content management functionality with respect to one or more associated items of content.

In some embodiments, business logic and/or services associated with and/or comprising business object framework 402 enforce access restrictions. Methods requiring access of a content item are configured and/or modified or supplemented as required, at the business logic/platform level, to enforce restrictions. For example, in some embodiments a query is modified, if applicable, to ensure that only results a user/process associated with the query is permitted to access are returned, e.g., by adding to a query a "where" clause that ensures that the results return include only items that (1) satisfy one or more search criteria indicated by a user and (2) the user has a right to access (e.g., view or browse). In some embodiments, session data is used to determine whether access to a particular content item(s) should be granted. An application seeking to access managed content on behalf of a user (individual, system, client or other application, process, etc.) obtains from the user and/or provides to the content management system a credential, such as a user/account name and password, and establishes with the content management system a session through which access to managed content can be requested and/or provided. The content management system maps the credential data to a set of access qualifying data for the session, e.g., by identifying any user name or other identifier, group memberships, roles, or other information by which in a given installation a user may be granted access rights. Requests received by the content management system (e.g., business logic, content server, etc.) from an application are associated with a corresponding session and access is granted to the extent authorized for that session. For example, in a session associated with a user "Bob" who is a member of the "Engineering Group", access in some embodiments would be granted only to content items for which the corresponding ACL grants rights explicitly to "Bob", the "Engineering Group", or both. Realizing security/access restrictions at the business logic/content management platform level ensures that such measures are applied uniformly regardless of the application and/or other vehicle used to access (or attempt to access) content.

Figure 5:
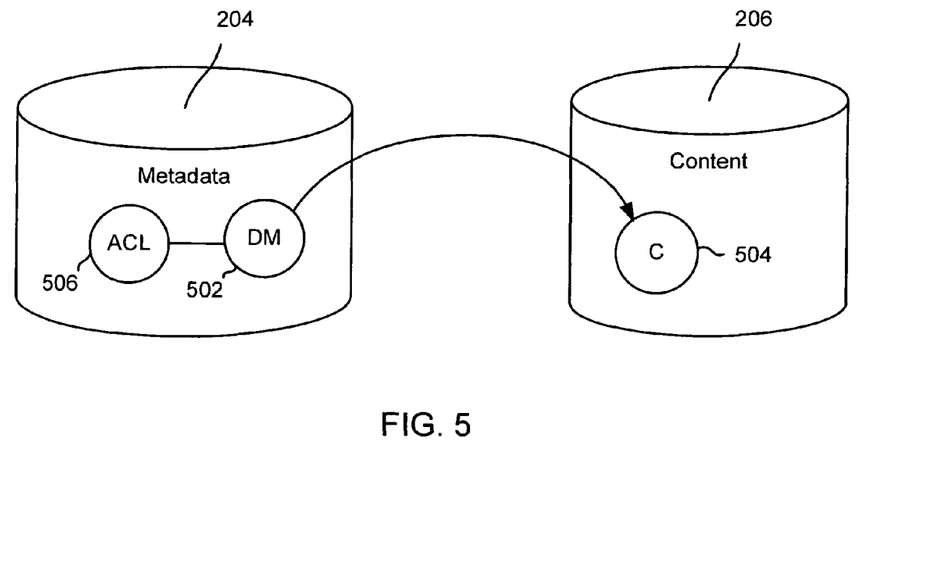
FIG. 5 is a block diagram illustrating an embodiment of elements associated with a content system.

FIG. 5 is a block diagram illustrating an embodiment of elements associated with a content system. In the example shown, an implementation object 502 stored in metadata store 204 is associated with a corresponding content item 504 stored in content store 206. The implementation object 502 represents the content item 504 in a body of managed content with which both are associated. FIG. 5 illustrates a simple example in which there is a one-to-one relationship between implementation object 502 and content item 504, but in some embodiments a single implementation object (or related set of objects) may be associated with two or more content items and/or a single content item may be associated with two or more implementation objects (e.g., to avoid duplicative storage of content). In the example shown, access control is provided at least in part by associating (e.g., linking) with implementation object 502, in metadata 204, ACL object 506. In some embodiments, ACL object 506 includes data indicating one or more access rights and/or restrictions for one or more users and/or groups of users. In some embodiments, certain methods and/or operations associated with a content management system with which the elements shown in FIG. 5 are associated access attributes and/or invoke methods of ACL object 506 to ensure that access rights/restrictions specified by/through ACL object 506 are enforced. In the query example described above, for example, in some embodiments access right/restriction data associated with ACL object 506 would be used to ensure that only content items a user associated with a session with which a query is associated are included in results returned in response to the query. In some embodiments, a call to a method associated with implementation object 502, such as to create a new version and/or check associated content item 504 in/out, are intercepted and/or not (fully) executed unless the user/session with which the call is associated has the access rights required, as determined by checking the data and/or invoking one or more methods of ACL object 506. In some embodiments, the called method of implementation object 502 is configured to check an attribute and/or invoke a method of ACL object 506 to determine if the user/session has the required access rights.

In some embodiments, the access privileges granted, e.g., through an ACL such as ACL object 506 of FIG. 5, may include rights/privileged expressed as one or more hierarchical or extended (non-hierarchical) "permits". Examples of hierarchical permits, listed in order from least to greatest access rights, include the following: none (no rights); browse (e.g., see metadata or summary data but not underlying content); read (view contents); relate (e.g., link to other contents/objects/contexts/logical structures); version (e.g., can save and edit as a new version but cannot save changes to original); write (e.g., can edit current version/instance and saved edited content in place of original); and delete (e.g., can delete content and/or associated metadata). In some embodiments, unless otherwise indicated a grant of a hierarchical access permit gives to the recipient of the grant the privileges associated with the permit and those of all levels below the granted permit in the hierarchy of permits. In the above example, a user granted "write" privileges with respect to a content item could also browse, read, relate, and version the content item. In some embodiments, in addition to and/or instead of hierarchical permits, one or more non-hierarchical (sometimes referred to herein as "extended") permits may be granted. For example, in some embodiments, an "extended delete" permit may be granted, e.g., to a system or data/backup administrator, to enable the administrator to delete content as allowed/required by a data retention policy without being able to read, write, version, etc., the content. Other examples of extended permits include "change permission" (e.g., limited rights to an author and/or administrator to change the access privileges, within limits, of one or more other users without necessarily giving the author/administrator those privileges, or any others) and "execute" for content items and/or other resources (e.g., application code, business logic, or portions thereof) capable of being executed (e.g., run).

Figure 6:
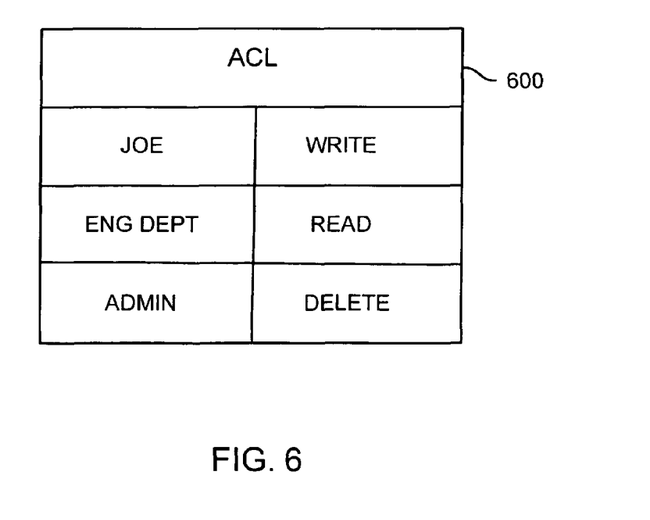
FIG. 6 is a block diagram illustrating an embodiment of an access control list.

FIG. 6 is a block diagram illustrating an embodiment of an access control list. In the example shown, ACL 600 includes three entries, a first granting "write" access to a user named "Joe", a second granting "read" access to a group named "Eng Dept" (short for "engineering department" in this example), and a third granting "delete" access to a user (or role) named "admin" (short for "administrator" in this example). In some embodiments, a request to "delete" a content item associated with ACL 600 would be allowed only if a session associated with the request were associated with the user "admin". Either "admin" or "Joe" would be permitted to write (e.g., edit and save as the same version) to the content item, and members of the engineering group would be permitted to read, but not write, version, etc., the content item.

Figure 7:
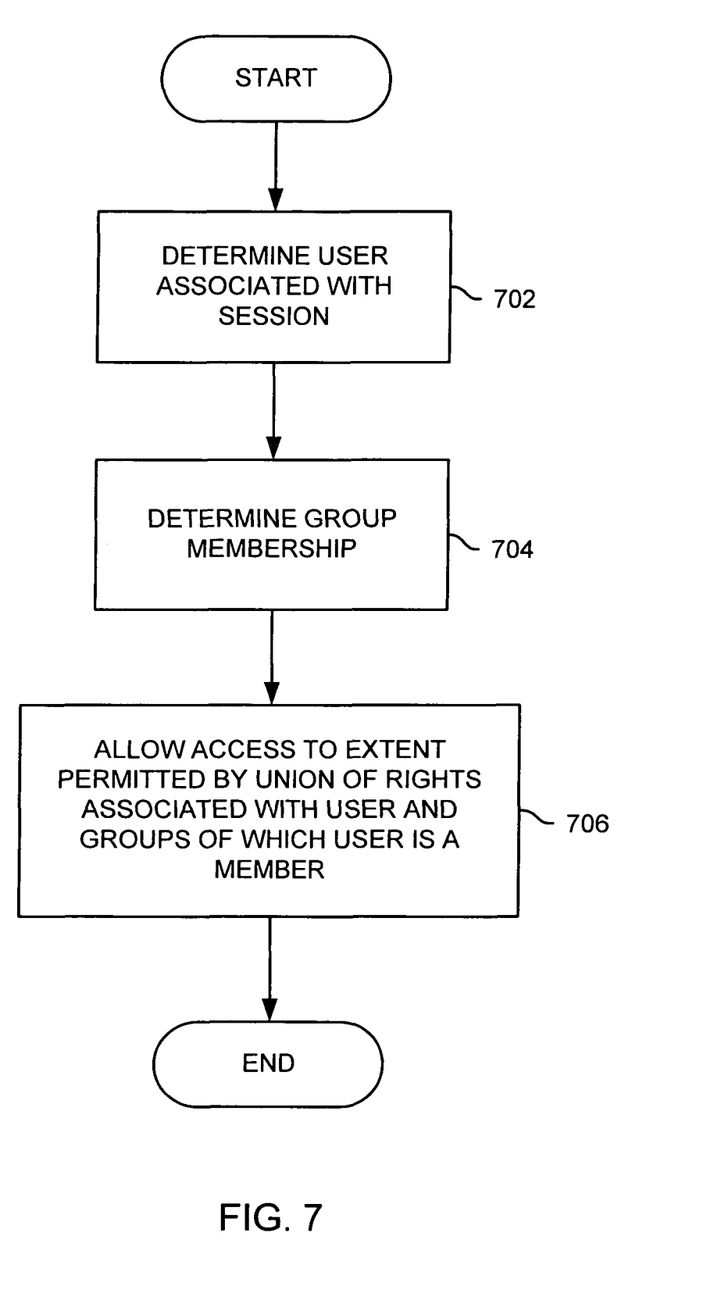
FIG. 7 is a flow chart illustrating an embodiment of a process for controlling access to managed content.

FIG. 7 is a flow chart illustrating an embodiment of a process for controlling access to managed content. In the example shown, at 702 a user associated with a session established or being established or requested to be established with a content management system is determined. In various embodiments, the user may be an individual, a role, a group, a system, a node, and/or an application or other process or logic. At 704, the group memberships, if any and as applicable, of the user determined at 702 are determined. In some embodiments, a user may be a member of one or more groups by virtue of his/her role or title, membership in other groups, and/or being listed individually in a list or other data indicating members of the group(s). For example, an employee "Bob" who is a "manager" in the "engineering department" and assigned to the "Western Region" would be allowed to access a content item for which the ACL granted rights to at least one of "Bob" individually, the "manager" role, the "engineering department" group, and the "Western Region" group. In some embodiments, 706 includes comparing, each time access to a content item is requested, the individual(s), role(s), and group(s) associated with a session with which the request is associated with the grant(s) of rights in an ACL associated with the content item to determine if any entity associated with the session has been granted access at the level required/requested.

Figure 8:
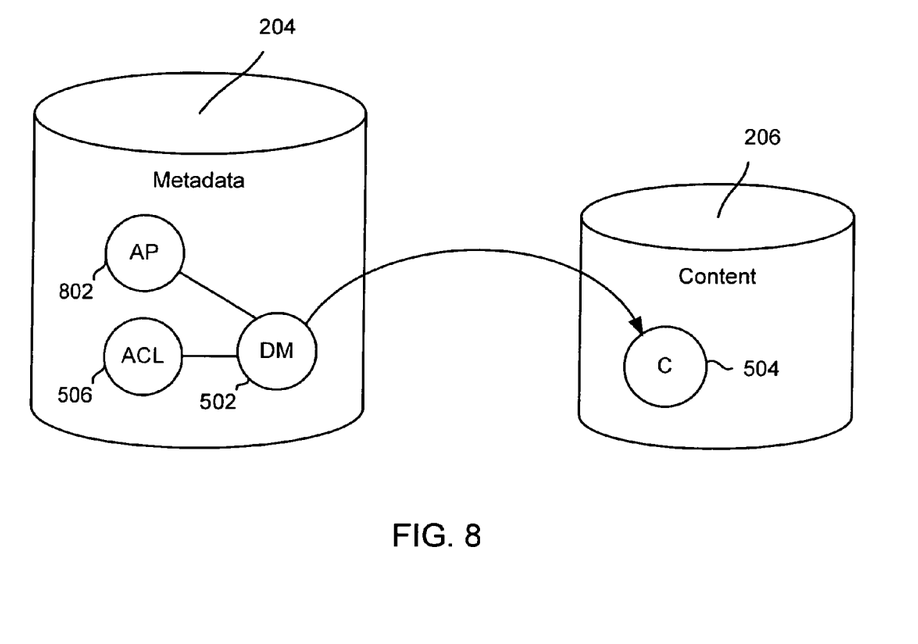
FIG. 8 is a block diagram illustrating an embodiment of elements associated with a content system.

FIG. 8 is a block diagram illustrating an embodiment of elements associated with a content system. In the example shown, in addition to an ACL object 506, an "application permit" (AP) object 802 has been associated with implementation object 502 in metadata 204. In this example, content management system supervised access controls are defined in and/or provided at least in part via ACL object 506, e.g., rights to perform typical content management operations such as "read", "write", and "delete". Additionally access controls associated with an application, such as a content authoring application, have been defined and stored in application permit 802. In some embodiments, application permit 802 comprises a free form ACL or similar structure in which one or more rights understood and/or to be enforced by an application that access content via a managed content system and/or runs on a platform associated with and/or comprising a content management system, as opposed to business logic and/or services of the content management platform/system itself, are defined. In some embodiments, an application creates application permit 802 by invoke a method and/or logic associated with the content management system and supplying a list of one or more users (or roles, groups, etc.) and corresponding rights defined and/or understood by, and intended to be enforced by, the application. When a user requests with respect to a content item an operation for which an application exists (or may exist), the application queries the content management system to determine whether the user has been delegated the right (e.g., individually, as a member of a group, etc.) to perform the requested operation with respect to the content item. In some embodiments, the application queries the content management system to determine whether an application permit associated with the application has been associated with the content item and, if so, what privilege(s) a user associated with a session of the application, a session of the content management system, or both has been delegated in the application permit. The content management system returns any privileges associated with the user or a group of which the user is a member. The content management system in some embodiments does not (or does not necessarily) understand the right or what it implies. The application then determines based on the response whether to allow the user to perform the operation with respect to the content item.

Figure 9:
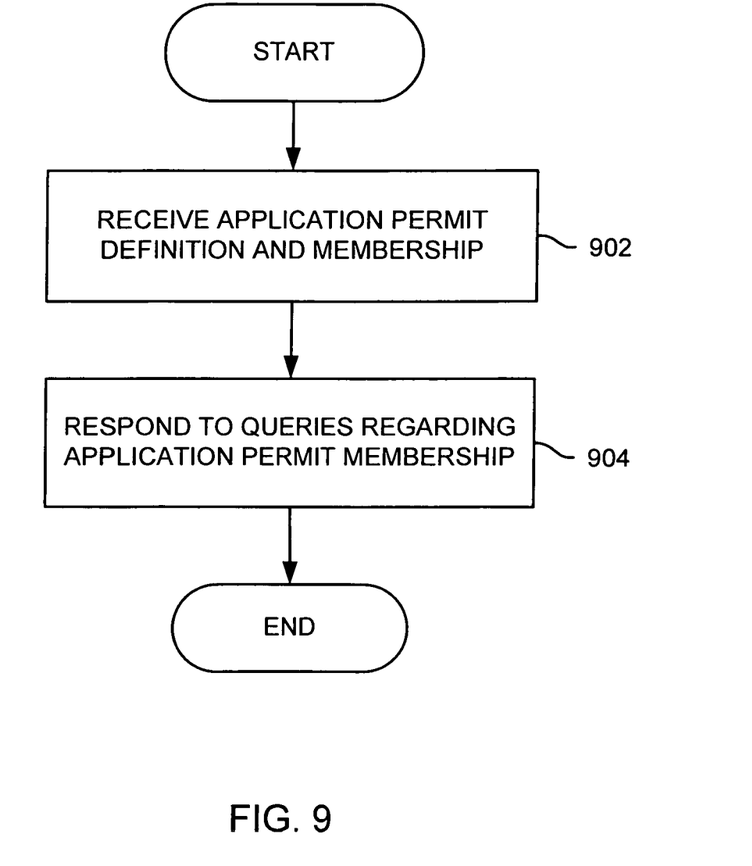
FIG. 9 is a flow chart illustrating an embodiment of a process for facilitating application-supervised control of access to managed content.

FIG. 9 is a flow chart illustrating an embodiment of a process for facilitating application-supervised control of access to managed content. In some embodiments, the process of FIG. 9 is implemented by a content management system, such as a content management platform or framework comprising an application server such as server 108 of FIG. 1 and/or a content system such as content system 110 of FIG. 1. In the example shown, at 902 application permit definition and membership are received. In some embodiments, 902 includes receiving a call to a method, logic, or service associated with creating an application permit. In some embodiments, 902 includes instantiating and/or receiving an instance of an application permit software object and/or one or more data values associated with and/or comprising attributes of the application permit object. In some embodiments, 902 includes receiving an indication that an application permit object is associated with a content item and associating the application permit and/or associated data with the content item, e.g., by linking the application permit to an implementation object configured to represent an associated content item in and/or provide content management functionality with respect to an associated content item. At 904, queries regarding application permit membership and/or rights are responded to, if/as received. In some embodiments, 904 includes one or more of receiving a query from an application, determining whether a content item associated with the query has associated with it an application permit associated with the application from which the request was received, and determined based at least in part on information about a user and/or session associated with the request whether the user and/or session associated with the request is granted in/via the application permit any right(s) (or a specified right identified in the query).

Figure 10:
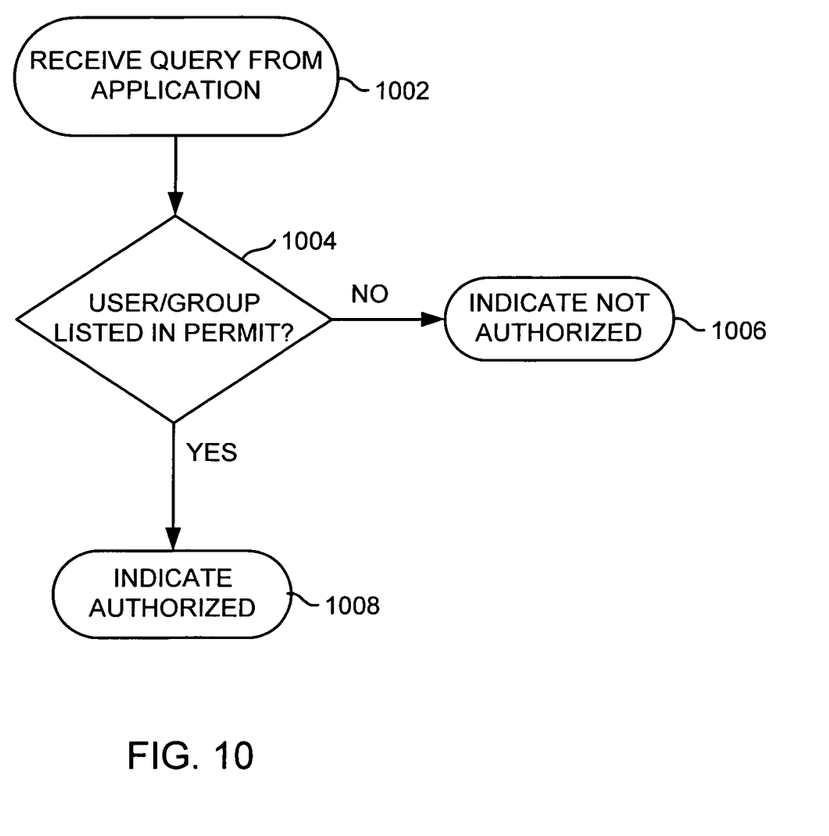
FIG. 10 is a flow chart illustrating an embodiment of a process for responding to queries from an application regarding access rights granted (or not granted) by or in an application permit.

FIG. 10 is a flow chart illustrating an embodiment of a process for responding to queries from an application regarding access rights granted (or not granted) by or in an application permit. In some embodiments, 904 of FIG. 9 includes the process of FIG. 10. At 1002, a query is received from an application. In this example, the application permit does not specify a range of application-supervised rights and instead comprises a list of users/groups to whom/which a single right associated with the application permit has been granted. At 1004, it is determined whether a user associated with the request and/or a group of which the user is a member, determined e.g., by identifying the group from the query received at 1002, application session information, and/or content management system session information and finding the user's group members through a lookup in one or more tables and/or records comprising a security information database associated with and/or comprising the content management system, is included in the application permit. If not, at 1006 an indication is provided to the requesting application that the user has not been delegated the right associated with the application permit. If the user (and/or a group of which the user is a member) is listed in the application permit, at 1008 an indication is provided to the requesting application that the user has been delegated the right associated with the application permit.

In some embodiments, an application permit may list one or more rights granted to users/groups identified in the application permit. In some embodiments, the content management system is queried to determine if an application-supervised access right specified in the query has been delegated to a user associated with the request, and the content management system performs a string comparison with any right delegated to the user in the application permit to determine whether any right, if any, granted to the user in the application permit matches the right identified in the query. In some embodiments, the content management system merely returns any/all rights granted to the user in/via the application permit and the application determines whether a right to perform an operation requested by the user is among the rights granted to the user.

Storing application permit information in a free form ACL or similar structure and/or associated logic and/or services available in a content management system by virtue of the content management system's need to receive and enforce access rights and restrictions enables application-supervised control of application-associated access to managed content without requiring that each application to provide a mechanism (data structures, logic, etc.) for defining and tracking such restrictions. The ability to define additional/different, application-centric access restrictions provides flexibility to application developers and relieves content management system vendors from the need to anticipate every access restriction an application developer may desire to impose.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing electronically stored content, comprising:
   receiving at a content management system a free form ACL associated with an application, wherein:
   1. the free form ACL permits definition of an access right other than from a set of predefined options, for a specified user;
   2. the free form ACL defines an application-supervised access right; and
   3. the content management system is not configured to supervise the application-supervised access right defined in the free form ACL;
   associating the free form ACL with a content item;
   responding to a query from the application regarding the content item and the application-supervised access right, wherein the response is based at least in part on the free form ACL and an access qualifying data for a session associated with the query based on user credential data; and
   wherein the application determines whether a user associated with the session is permitted to perform an action associated with the application-supervised access right based at least in part on the response to the query.

2. A method as recited in claim 1, further comprising storing the free form ACL.

3. A method as recited in claim 2, wherein the free form ACL is stored in a metadata store associated with the content management system.

4. A method as recited in claim 3, further comprising associating the free form ACL with a metadata associated with the content item.

5. A method as recited in claim 1, wherein determining based at least in part on access qualifying data includes checking the free form ACL to determine whether data associated with the user is included in the free form ACL.

6. A method as recited in claim 1, wherein the free form ACL is received from the application configured to grant the access right.

7. A method as recited in claim 1, wherein the application-supervised access right is a right to print the content item.

8. A method as recited in claim 1, wherein the application is configured to grant the access right based at least in part on the response to the query.

9. A method as recited in claim 1, wherein an entry of the free form ACL is created by the application.

10. A method as recited in claim 1, wherein the access qualifying data is one or more of: identification of a user name or other identifier, group membership, role, or other information by which in a given installation a user may be granted access rights.

11. A method as recited in claim 1, wherein responding to the query includes returning any application-supervised privileges associated with the session, wherein the session is associated with a user or a group.

12. A method as recited in claim 1, wherein the ACL is a two-column list of text.

13. A method as recited in claim 1, wherein the user is one or more of the following: an individual, a role, a group, a system, a node, an application, another process, and logic.

14. A method as recited in claim 1, wherein user credential data is one or more of the following: a user name and password for a system, and an account name and password for a system.

15. A method as recited in claim 1, wherein the access qualifying data for a session associated with the query is a union of rights associated with the user and groups of which the user is a member.

16. A method as recited in claim 1, wherein responding comprises indicating the user is not authorized in the event that the free form ACL does not list the user for the access right.

17. A method as recited in claim 1, further comprising performing a string comparison with any right delegated to the user.

18. A method as recited in claim 1, wherein responding comprises returning all rights granted to the user.

19. A method as recited in claim 1, wherein the access right is a hierarchical access right.

20. A method as recited in claim 1, wherein the access right is an extended access right.

21. A content management system, comprising:
a communication interface configured to:
receive a free form ACL associated with an application, wherein:
1. the free form ACL permits definition of an access right other than from a set of predefined options, for a specified user;
2. the free form ACL defines an application-supervised access right; and
3. the content management system is not configured to supervise the application-supervised access right defined in the free form ACL; and
a processor coupled to the communication interface and configured to:
associate the free form ACL with a content item;
respond to a query from the application regarding the content item and the application-supervised access right, wherein the response is based at least in part on the free form ACL and an access qualifying data for a user associated with the query based on user credential data; and
wherein the application determines whether a user associated with the session is permitted to perform an action associated with the application-supervised access right based at least in part on the response to the query.

22. A computer program product for managing electronically stored content, the computer program product being embodied in a computer readable storage medium and comprising computer instructions for:
receiving at a content management system a free form ACL associated with an application, wherein:
1. the free form ACL permits definition of an access right other than from a set of predefined options, for a specified user;
2. the free form ACL defines an application-supervised access right; and
3. the content management system is not configured to supervise the application-supervised access right defined in the free form ACL;
associating the free form ACL with a content item;
responding to a query from the application regarding the content item and the application-supervised access right, wherein the response is based at least in part on the free form ACL and an access qualifying data for a user associated with the query based on user credential data; and
wherein the application determines whether a user associated with the session is permitted to perform an action associated with the application-supervised access right based at least in part on the response to the query.

* * * * *